DOCUMENT STACKER AND/OR SORTER

Filed June 4, 1968

INVENTORS
Jacob Rabinow
William P. Gingras
BY Joseph A. Genovese
ATTORNEY

United States Patent Office 3,531,108

Patented Sept. 29, 1970

3,531,108

DOCUMENT STACKER AND/OR SORTER

Jacob Rabinow, Bethesda, and William P. Gingras, Rockville, Md., assignors to Control Data Corporation, Rockville, Md.

Filed June 4, 1968, Ser. No. 734,271

Int. Cl. B65h 29/60

U.S. Cl. 271—64 8 Claims

ABSTRACT OF THE DISCLOSURE

Apparatus which synchronizes the documents of a stream with a movable document-handling member of the type which requires the documents to be received in phase relationship with the member. This is accomplished on-the-fly by detecting the phase relationship between the document handling member and each ducument as it enters a zone in the path of the stream, and by adjusting the position of each document which is out of phase with the member. Position adjustment relative to the member is obtained by either accelerating or decelerating the document over a short distance sufficient to bring it into phase or synchronization with the document-handling member.

This invention relates to document handling apparatus and particularly to high speed sorting and/or stacking of documents of many kinds, sizes and thicknesses, such as printed sheets, strips or cards used in magnetic or optical character recognition machines, punch cards, envelopes, and others.

The handling of documents for sorting or stacking or for other purposes presents difficulties which vary in accordance with the physical characteristics of the documents. For example, document handling in punch card equipment is not severe because the cards have considerable body (.007 inch thick), are of uniform size and thickness and they have a favorable aspect ratio. On the other hand, document handling in magnetic and optical character recognition equipment is considerably more difficult even if the documents are of one size. These documents are more flimsy than cards and they tend to flutter, twist and skew. Such documents ordinarily vary in thickness, weight and stiffness, and they more often than not have a poor aspect ratio for machine-handling. And, the machine-handling difficulties greatly increase when the apparatus is required (a) to handle documents in batches where the documents of each batch can vary as to size, shape, thickness, and/or stiffness, or worse (b) to handle documents which are intermixed as to size, shape, thickness and/or stiffness. Our invention is primarily concerned with document handling under conditions such as those specified at (a) and/or (b) although it is obvious that our invention is applicable under the less stringent document handling requirements.

While existing document handling apparatus can be classified in many other ways, some apparatus is designed to be almost totally asynchronous and other apparatus is synchronous in the sense that the feeding and speed of each document are controlled to be coordinated with the motions of mechanical elements of the apparatus. A good example of an asynchronous document handling apparatus is a stacker which simply drops documents into bins by gravity with or without an air pressure assist. Such stackers do not stack flimsy documents neatly and at high speeds documents often flutter badly and too often they fail to stack at all, causing a jam or other problems.

One of the more successful kinds of stacker uses a stacking wheel with curved slots forming document pockets which open through the periphery of the wheel. The wheel accepts successive documents as it rotates and they are stripped out of the wheel one-by-one in a manner such that the documents are neatly disposed one upon the other in a stack. This kind of stacker requires that the leading edge of each document be in phase with the rotation of the wheel so that the successive documents will enter the pockets and will not strike the periphery of the wheel between the pocket entrances. It is difficult to maintain the necessary synchronization between wheel rotation and the position of the documents in reaching and entering the document pockets in the wheel. This is particularly true when the documents are moved through a reasonably long path before entering the wheel pockets. Synchronization becomes even more difficult when either different batch sizes or intermixed size documents are handled. And, synchronization becomes impossible when the feeding of documents is random and/or intermittent.

An object of our invention is to provide a document handling apparatus having means for detecting the position of a moving document with respect to the phase of a moving document-handling member and further means for adjusting the position of the document if it is out of phase with the member, the adjustment being sufficient to bring the document into synchronism with the member.

Another object of the invention is to provide an acceleration zone in the path of the documents ahead of the above-mentioned document handling member in order to space each document from the one following it. This provides several advantages such as making certain that long documents will not crowd each other upon entering the entrances of the document-handling member, and providing ample room between documents to adjust their phase relationship with the member by either accelerating or slowing the document.

A further object of the invention is to provide document handling apparatus as described above and wherein the document handling member is a rotating wheel having curved slots opening through the wheel periphery to form document pockets whereby the documents are accepted in the pockets turned with the wheel rotation and stripped from the wheel into an orderly, neat stack.

Another object of our invention is to provide a document sorting apparatus having a plurality of sort stations each with a slotted wheel as above, and all of the wheels being phased in a manner that a single detection and document-adjusting means will suffice to synchronize the documents with all of the wheels.

A further object of the invention is to provide a document stacker and/or sorter for a stream of documents of equal or unequal spacing, with means to detect the position of the leading edge of each successive document and compare its position relative to the phase of a document handling member, and further means to adjust the said relative position of the document, if necessary, to bring it into phase with the document handling member. As a result of this some or all of the documents can be asynchronous with respect to the document handling member anywhere and/or everywhere upstream of the detecting means, and they will be made synchronous with the member as they approach and reach the same.

Other objects and features will become evident in the dscription of the illustrated form of the invention wherein.

Figures 1, 2, 3:
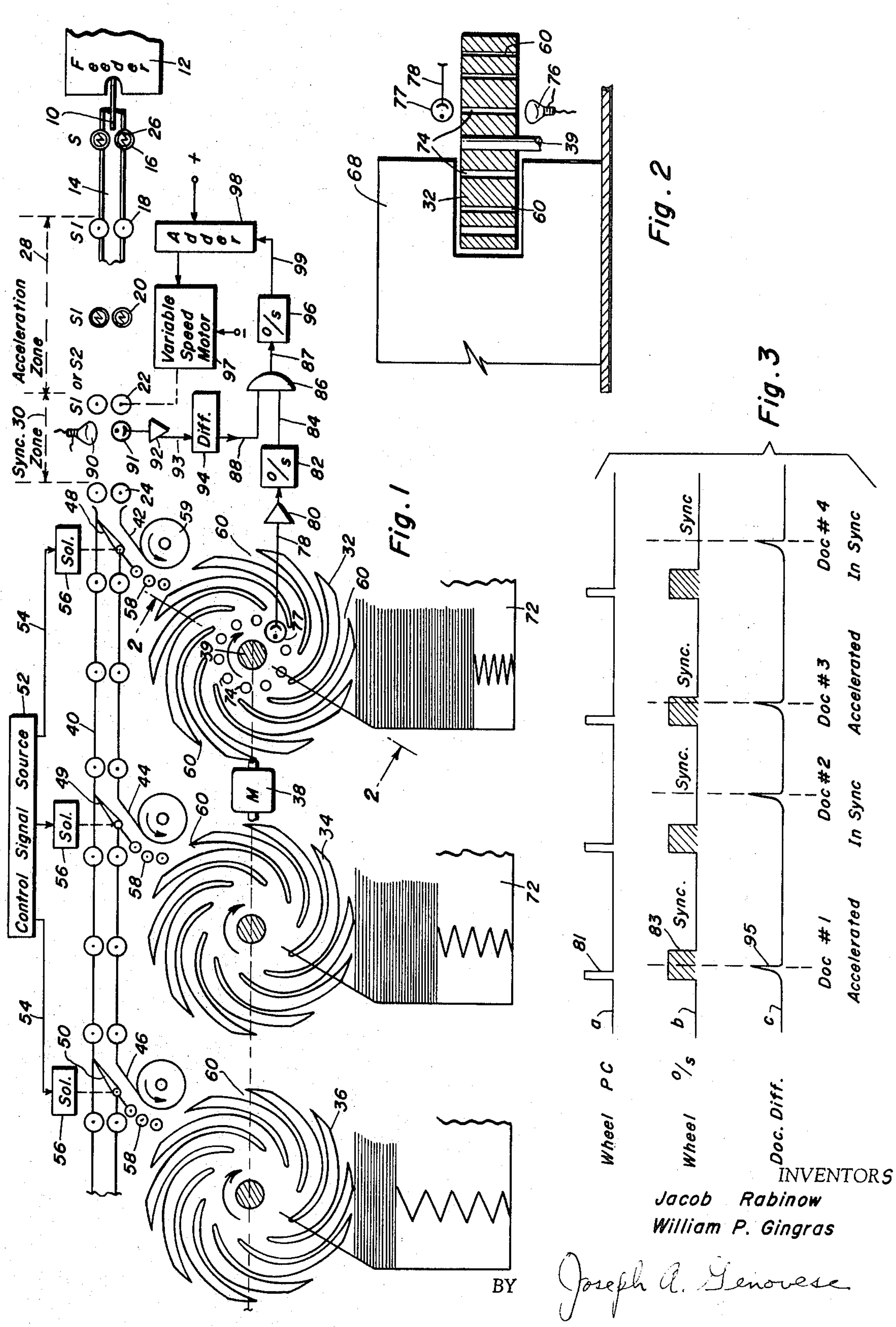
FIG. 1 is a top diagrammatic view of a document sorter having several stackers.
FIG. 2 is a sectional view taken on the line 2—2 of FIG. 1.
FIG. 3 is a group of curves forming a timing diagram for the stackers.

The sorting apparatus (FIG. 1) operates with a stream of documents 10 issuing from any source 12 schematically shown as a feeder. In practice this can be a conventional feeder or a part of another piece of equipment, for instance an optical or magnetic character reader or card reader or a card punch, a postal address reader, etc. The documents are constrained to a given path by any means such as the illustrated roller conveyor. The conveyor consists of a structural member 14, e.g. a channel, having pairs of pinch or drive rollers along the length thereof. We shall be first concerned with roller pairs 16, 18, 20, 22 and 24, both rollers of each pair of which can be driven, or one of which can be driven and the other an idler. The roller drivers for pairs 16, 18, 20 and 24, are not shown since they are common in the art and well known under several forms such as motor operated pulleys and belts, sprockets and chains, gearing, etc.

Roller pair 16 is driven at speed S, and the rollers are driven through overrunning clutches 26, e.g. sprag clutches so that rollers 18 which operate at a higher speed S1 can pull the document freely through roller pair 16. The space 28 along the document path is an acceleration zone where rollers 18 accelerate each document to space it from the lower speed document following it. Roller pair 20 is driven through overrunning clutches so that rollers 22 which may (or may not) operate at a faster speed S2 can withdraw the document more easily from between rollers 20.

Rollers 22 are located in the synchronizing zone 30 where the leading edge of the document is detected (means described later) and the position of the document is adjusted to synchronize or phase the document with one or more downstream document handling members such as slotted wheels 32, 34 and 36 (also described later). The adjustment is made by operating roller pair 22 at speed S2 for a brief interval to advance the document a distance sufficient to synchronize or phase it with the document handling members. Speed S2 can be lower than speed S1 (for a brief interval) in which case the leading edge of the document is brought into phase with the wheels 32, 34 and 36 just as effectively as accelerating the document. If the detected position of the document is within the phase tolerance of the wheels (consider only wheel 32 for simplicity), roller pair 22 operates at speed S1 which is the same as rollers 20 and roller pair 24. If desired, the roller pair 24 can operate at speed S so long as the phasing of the rotary wheels and the distances between the rollers 24 and wheels 32, 34 and 36 are taken into design consideration. The wheels 32, 34 and 36 and all others (not shown) are synchronized, for example, by being driven by a single motor 38 through timing belts or sprockets and chains or by a lay shaft and gearing.

Roller pair 24 propels the document into a sync zone established by roller conveyor 40 having discharge branches 42, 44 and 46, there being one branch for each stacker and any other sort destination such as a bin (not shown). Deflector vanes 48, 49 and 50 are located at the junctures of the branches with conveyor 40 to deflect documents into the branches or allow them to pass depending upon the pivotal position of the vanes. The timing and actuation of the vanes is accomplished from an external control signal source (e.g. an optical character reader, computer, etc.) represented at 52, via signal lines 54 connected to vane drivers schematically shown as solenoids 56.

Except for a photoelectric phase timing generator for wheel 32, wheels 32, 34 and 36 are identical, and each has an identical document input device 58 to direct documents from barnches 42, 44 and 46 into the pockets of their associated wheels 32, 34 and 36. Each device 58 has a driven larger roller 59 and a peripherally located set of cooperating smaller rollers. Wheel 32 has a shaft 39 (driven by motor 38) attached to its center. A plurality of curved slots 60 open through the wheel periphery and terminate short of the central area of the wheel. The slots are outwardly tapered to provide wide entrances for documents to enter the slots from device 58. The slots function as the aforesaid document pockets, and, as shown, their entrances are approximately 80% wider than the leading or trailing adjacent edge of the wheel. Thus during wheel rotation, for each pocket pitch there is an acceptance tolerance of approximately 80% per pocket pitch. Conversely, a document must not be propelled into the wheel during a specific 20% of the rotation of each slot entrance plus its adjacent edge of the wheel (either ahead or behind the slot entrance depending upon arbitrary design considerations, explained later). The term "pitch" as used above is measured as the circumference of the wheel which includes one pocket entrance plus one inter-pocket peripheral edge portion.

As wheel 32 rotates and successive documents enter slots 60, the leading edges of the documents engage stripper 68 (FIG. 2) located in part above and below the top and bottom surfaces of the wheel. The stripper is disposed approximately radially of the wheel but this location is not critical as it may be located on a chord of the wheel. The stripper position is such as to smoothly extract the successive documents from the wheel as it rotates, causing the documents to stack one upon the other in a neat stack 70 within a tray 72. As the periphery of wheel 32 brushes over the input end of the stack, the stack is gently agitated to help the stacking procedure.

We have referred to means for detecting the position of the leading edge of the document (in zone 30) and the acceleration (or deceleration) of the document to synchronize it with wheel 32 and hence wheels 34 and 36. However, first consider the photoelectric phase timing generator (FIGS. 1–3). Wheel 32 has a circular series of holes 74, therebeing one hole for each slot 60. A light source 76 (FIG. 2) is located on one side of the wheel and a photocell 77 is disposed on the other side. As the wheel rotates the photocell signals each time that a hole 74 unblanks the light source thereby signaling the phase of the slots. The geometrical relation between the holes 74 and slot entrances is such that the pitch measurement is begun at the 20% document-unacceptable portion of the pitch and followed by the 80% "in phase" or document-accept arc of rotation. Thus, the photocell signal on line 78 is shaped and amplified by amplifier 80 (signal 81 of curve *a* in FIG. 3), and the amplified signal operates one shot multivibrator 82 (signal 83 of curve *b*) whose duration is equal to the time for the wheel to rotate through an arc equal to the 20% of a pitch. The output of the one shot multivibrator 82 is conducted over line 84 as an entry to a two-input AND gate 86. Thus, gate 86 will pass a signal, if any, on its other input line 88 during the period of the one shot multivibrator 82 and at no other time. This leaves the period corresponding to the document-accept 80% of pitch of one phase, during which the gate 86 will not pass a signal over its output line 87.

The previously discussed means for detecting the leading edge of the document can be constructed as a circuit which is closed by the leading edge of a document engaging and closing a switch in synchronization zone 30. However, a photoelectric circuit can be used for its inherent advantages. Thus lamp 90 directs its beam across the document path in zone 30 to photocell 91 whose output is amplified as at 92 and conducted on line 93 to differentiator 94. The differentiated signal 95 (curve *c* of FIG. 3) is conducted on line 88 as a previously mentioned input to AND gate 86. The differentiator responds only to positive-going signals (curve *c*) whereby the differentiator output occurs only as the photocell 91 experiences a transition from light to dark, i.e. as the leading edge of the document intercepts the light beam from lamp 90.

When the document leading edge is detected, both its position relative to wheels 32, 34 and 36 and the time required for the leading edge to reach the wheels are known because the speed of the document is controlled and the distance between the light beam and each wheel is fixed by design. The output signals from one shot multivibrator 82 signify the out-of-phase portion (curve b, signal 83) of each pocket pitch. If, therefore, a document leading edge signal 95 (curve *c*) coincides with a signal 83 over lines 88 and 84 respectively at gate 86 (and only under these conditions), one shot multivibrator 96 is fired by the gate output signal on line 87. This causes the document in zone 30 to be positionally adjusted with respect to the wheels 32, 34 and 36. Adjustment is accomplished by accelerating (or decelerating) the document for a brief interval sufficient to bring it into phase with the wheels. As shown in FIG. 3, the distance that the document is advanced (or retarded) to assure bringing it into phase will be any fixed increment greater than that corresponding to 20% of a pitch and less than 80% of a pitch rotational movement of the wheels 32, 34 and 36. FIG. 3 also shows examples of several detected documents. Document No. 1 will be accelerated, document No. 2 will not because it is already synchronized and in phase with the wheels, document No. 3 will be adjusted, and document No. 4 will not be adjusted.

Acceleration or deceleration of the document in zone 30 can be accomplished in many ways such as by adding or subtracting components of motion to a differential (not shown) drive for one or both rollers of pair 22. However, the simplest method to illustrate is a variable speed motor 97 connected to a power source. The motor shaft drives rollers 22 at a normal speed of S1. To change speed the output of one shot 96 is conducted to adder 98 over line 99, and the adder superimposes the one shot output on the motor power source. This increases the speed of motor 97 for the duration of one shot multivibrator 96 causing roller pair 22 to operate at speed S2 for the period of the multivibrator. In order to decelerate the document (instead of accelerating it) to adjust the position of a non-phased document the polarity of the signal of one shot multivibrator 96 is selected to have it buck (at adder 98) the motor power supply voltage instead of adding to it.

What is claimed is:

1. In a document stacker having a movable member for synchronously handling the documents, means for establishing a document path into which documents are adapted to be fed and conveyed, an acceleration zone in said path and having means for accelerating the documents which enter said zone, a document synchronizing zone in said path located between said acceleration zone and said movable member, means for detecting the position of each document relative to the position of said movable member and for thereby determining whether each document is synchronized with said movable member, means responsive to said detecting means for synchronizing each asynchronous document with said movable member and said synchronizing means including a document engaging member which changes the speed of the asynchronous document.

2. The subject matter of claim 1 and a second movable member for synchronously handling documents, said path communicating with both of said members, and means coupling said members for movement in phase with each other so that the same said detecting means and synchronizing means synchronize documents for both of said movable members.

3. The subject matter of claim 1 wherein said detecting and determining means include means to sense an edge portion of a document and to provide an electrical signal pertaining to said edge portion, means for providing phase signals having components corresponding to synchronous and asynchronous document-acceptance positions of said movable member, and means for comparing said electrical signals for coincidence with said phase signals components.

4. The subject matter of claim 3 wherein said synchronizing means include a document conveyor member, means to actuate said conveyor member at a predetermined speed, and means to change said speed in response to coincidence of said electrical signal with a said phase signal component which corresponds to an asynchronous document-acceptance position of the document.

5. Apparatus for synchronizing the documents of a stream with a movable document-handling member which requires the documents to be received in phase with the member, said apparatus comprising means for detecting the phase relationship between each document entering a zone in the path of said stream and for providing a signal corresponding to said phase relationship, and means responsive to said signal for adjusting the phase relationship of each document which is detected to be out of phase with said member by changing the speed of the out of phase documents.

6. Apparatus of claim 5 and means upstream of said detecting means for accelerating the documents to space each document from its following document ahead of said adjusting means.

7. Apparatus of claim 5 and a document conveyor downstream of said detecting means, means to sort the documents toward destinations as they are moved by said conveyor, a second movable document-handling member, means for synchronizing the movement of both of said members, said members being located respectively between said sort means and two of said destinations and being a predetermined distance from each other so that said phase adjusting means brings documents into phase with both of said document handling members regardless of whether said sort means directs the documents to one or the other of said members.

8. Apparatus of claim 7 and means for accelerating the documents ahead of said detecting means, and said adjusting means including means for changing the speed of the out-of-phase documents for a time sufficient to bring the last mentioned documents into phase with said members.

References Cited

UNITED STATES PATENTS

| | | | |
|---|---|---|---|
| 2,837,198 | 6/1958 | Griffin. | |
| 3,343,672 | 9/1967 | De Vries | 271—57 X |

RICHARD A. SCHACHER, Primary Examiner

U.S. Cl. X.R.

209—74; 271—71